(12) United States Patent
Kim

(10) Patent No.: US 11,015,701 B2
(45) Date of Patent: May 25, 2021

(54) LUBRICATION SYSTEM FOR IN-WHEEL MOTOR POWERTRAIN

(71) Applicant: HYUNDAI TRANSYS INCORPORATED, Seosan-si (KR)

(72) Inventor: Jung Su Kim, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 21 days.

(21) Appl. No.: 16/695,455

(22) Filed: Nov. 26, 2019

(65) Prior Publication Data

US 2020/0208733 A1 Jul. 2, 2020

(30) Foreign Application Priority Data

Dec. 27, 2018 (KR) ........................ 10-2018-0170328

(51) Int. Cl.
  *B60B 35/12* (2006.01)
  *F16H 57/04* (2010.01)
  (Continued)

(52) U.S. Cl.
  CPC ....... *F16H 57/0441* (2013.01); *B60B 35/125* (2013.01); *B60K 7/0007* (2013.01); *F16H 1/20* (2013.01); *F16H 37/041* (2013.01); *F16H 57/02* (2013.01); *F16H 57/023* (2013.01); *F16H 57/042* (2013.01); *F16H 57/0404* (2013.01); *F16H 57/0423* (2013.01);
  (Continued)

(58) Field of Classification Search
  CPC .. F16H 57/0441; F16H 57/023; F16H 37/041; F16H 57/0452; F16H 57/0404; F16H 57/042; F16H 1/20; F16H 57/0423; F16H 57/0486; F16H 57/0495; F16H 57/02; F16H 2057/02052; F16H 2702/02; F16H 2057/02034; F16H 57/0424; F16H 57/0436; F16H 57/0471; F16H 57/0434; F16H 57/0482; B60K 7/0007; B60K 2007/0061; B60B 35/125
  See application file for complete search history.

(56) References Cited

U.S. PATENT DOCUMENTS

2010/0140020 A1* 6/2010 Murahashi .......... F16H 57/0434
  184/6.12
2013/0057048 A1* 3/2013 Ishikawa ............... B60K 7/0007
  301/6.5

(Continued)

*Primary Examiner* — Justin Holmes
(74) *Attorney, Agent, or Firm* — Novick, Kim & Lee, PLLC; Jae Youn Kim; Jihun Kim

(57) ABSTRACT

A lubrication system for an in-wheel motor powertrain is proposed. The system includes a housing having a motor and supporting a wheel, and having a space therein; an input gear and an output gear provided in the housing; two intermediate gears each provided with a first gear meshed with the input gear, and a second gear meshed with the output gear and having a pitch circle diameter different from that of the first gear, the first and second gears being integrally and concentrically coupled together; a pump gear meshed with the input gear; a bearing plate rotatably supporting the input gear, the output gear, and the intermediate gears; a cover plate configured to provide a part of a lubrication pump driven by the pump gear; and a first oil supply part provided by the cover plate and a mid-plate to lubricate the output gear and the intermediate gears.

9 Claims, 5 Drawing Sheets

(51) Int. Cl.
*F16H 57/023* (2012.01)
*F16H 37/04* (2006.01)
*B60K 7/00* (2006.01)
*F16H 1/20* (2006.01)
*F16H 57/02* (2012.01)

(52) U.S. Cl.
CPC ..... *F16H 57/0452* (2013.01); *F16H 57/0486* (2013.01); *F16H 57/0495* (2013.01); *B60K 2007/0061* (2013.01); *F16H 2057/02034* (2013.01); *F16H 2057/02052* (2013.01); *F16H 2702/02* (2013.01)

(56) References Cited

U.S. PATENT DOCUMENTS

2016/0204679 A1* 7/2016 Yamada .................. B60K 1/00 310/45
2017/0120676 A1* 5/2017 Chung ................. B60K 17/046
2017/0197503 A1* 7/2017 Yukishima .............. F16H 57/04

* cited by examiner

LUBRICATION SYSTEM FOR IN-WHEEL MOTOR POWERTRAIN

CROSS REFERENCE TO RELATED APPLICATION

The present application claims priority to Korean Patent Application No. 10-2018-0170328, filed Dec. 27, 2018, the entire contents of which is incorporated herein for all purposes by this reference.

BACKGROUND OF THE INVENTION

Field of the Invention

The present invention relates to a lubrication system for an in-wheel motor powertrain.

Description of the Related Art

When the driving force of a vehicle is realized by an in-wheel motor powertrain in a commercial vehicle such as a truck or a bus, the space occupied by the powertrain may be reduced, which particularly has a merit for easy implementation in a low-floor bus and the like.

As described above, in order to implement the driving force of the commercial vehicle by using the in-wheel motor powertrain, the driving force generated by a motor must be reduced in speed by a relatively large reduction ratio to be transmitted to driving wheels, and the vehicle must be equipped with a compact configuration to ensure vehicle mountability.

While disposing a plurality of gears to realize a large reduction ratio in a compact configuration, the in-wheel motor powertrain as described above requires a lubrication system for properly lubricating these gears and bearings to ensure smooth and stable operation thereof.

The foregoing is intended merely to aid in the understanding of the background of the present invention, and is not intended to mean that the present invention falls within the purview of the related art that is already known to those skilled in the art.

SUMMARY OF THE INVENTION

The objective of the present invention is to provide a lubrication system for an in-wheel motor powertrain that may ultimately secure stable durability of the in-wheel motor powertrain by way of sufficiently and efficiently lubricating the gears and bearings in an in-wheel motor powertrain including a plurality of gears and bearings for realizing a relatively large reduction ratio in a small and compact space.

In order to achieve the objective of the present invention, there is a lubrication system for in-wheel motor powertrain, the lubrication system including: a housing having a motor coupled to a first side thereof and supporting a wheel at an outer circumferential surface thereof, and having a space therein; an input gear provided to be directly connected to the motor in the housing; an output gear disposed parallel to the input gear; two intermediate gears each comprising a first gear meshed with the input gear, and a second gear meshed with the output gear and having a pitch circle diameter different from that of the first gear, the first and second gears being integrally and concentrically coupled together; a pump gear meshed with the input gear; a bearing plate rotatably supporting the input gear, the output gear, and the intermediate gears on the first side of the housing; a cover plate overlapping the bearing plate with a mid-plate interposed therebetween, and configured to provide a part of a lubrication pump configured to be driven by the pump gear to pump oil; and a first oil supply part provided by the cover plate and the mid-plate to lubricate first sides of the output gear and the intermediate gears with oil discharged from the lubrication pump.

The lubrication system for in-wheel motor powertrain may further include a second oil supply part provided in the housing so as to achieve lubrication of second sides of the output gear and the intermediate gears with the oil discharged from the lubrication pump.

A rotor of the lubrication pump may be provided to be rotatable on the bearing plate; the cover plate may be provided with a flow-path forming groove for forming an inlet-side and an outlet-side flow path of the lubrication pump and the first oil supply part; and the mid-plate may cover the flow-path forming groove of the cover plate to form the first oil supply part and the inlet-side and the outlet-side flow path of the lubrication pump.

The first oil supply part may include: a first output gear lubrication part connected to an upper side from the outlet-side flow path of the lubrication pump and having a space extended to store oil at a position corresponding to the first side of the output gear; and a first intermediate gear lubrication part extending downward from each side of the first output gear lubrication part to provide oil to a position corresponding to the first side of each of the two intermediate gears.

An oil sump may be provided in the housing; an oil filter may be provided in the housing to allow oil from the oil sump to be filtered; and a first connection pipe may be provided between the housing and the bearing plate so that the oil passing through the oil filter is supplied to an inlet side of the lubrication pump.

A second connection pipe serving as an oil passage may be provided between the outlet side of the lubrication pump and the second oil supply part of the housing.

The second oil supply part may include: a second output gear lubrication part configured to transfer oil supplied into the housing through a second connection pipe to a position corresponding to the second side of the output gear; and a second intermediate gear lubrication part branched to both sides from a flow path connected to the second output gear lubrication part from a second connection pipe and configured to deliver oil to positions corresponding to second sides of the two intermediate gears.

A second side of the housing may be provided with a planetary reduction mechanism configured to perform further reduction in speed of rotational force from the output gear to transfer the force to the wheel.

The motor may be positioned at an outer side of the cover plate, and a rotation shaft of the motor may be coupled to the input gear after sequentially passing through the cover plate, the mid-plate, and the bearing plate.

The present invention may ultimately secure stable durability of an in-wheel motor powertrain by way of sufficiently and efficiently lubricating the gears and bearings in the in-wheel motor powertrain including a plurality of gears and bearings for realizing a relatively large reduction ratio in a small and compact space.

DETAILED DESCRIPTION OF THE INVENTION

Figure 1:
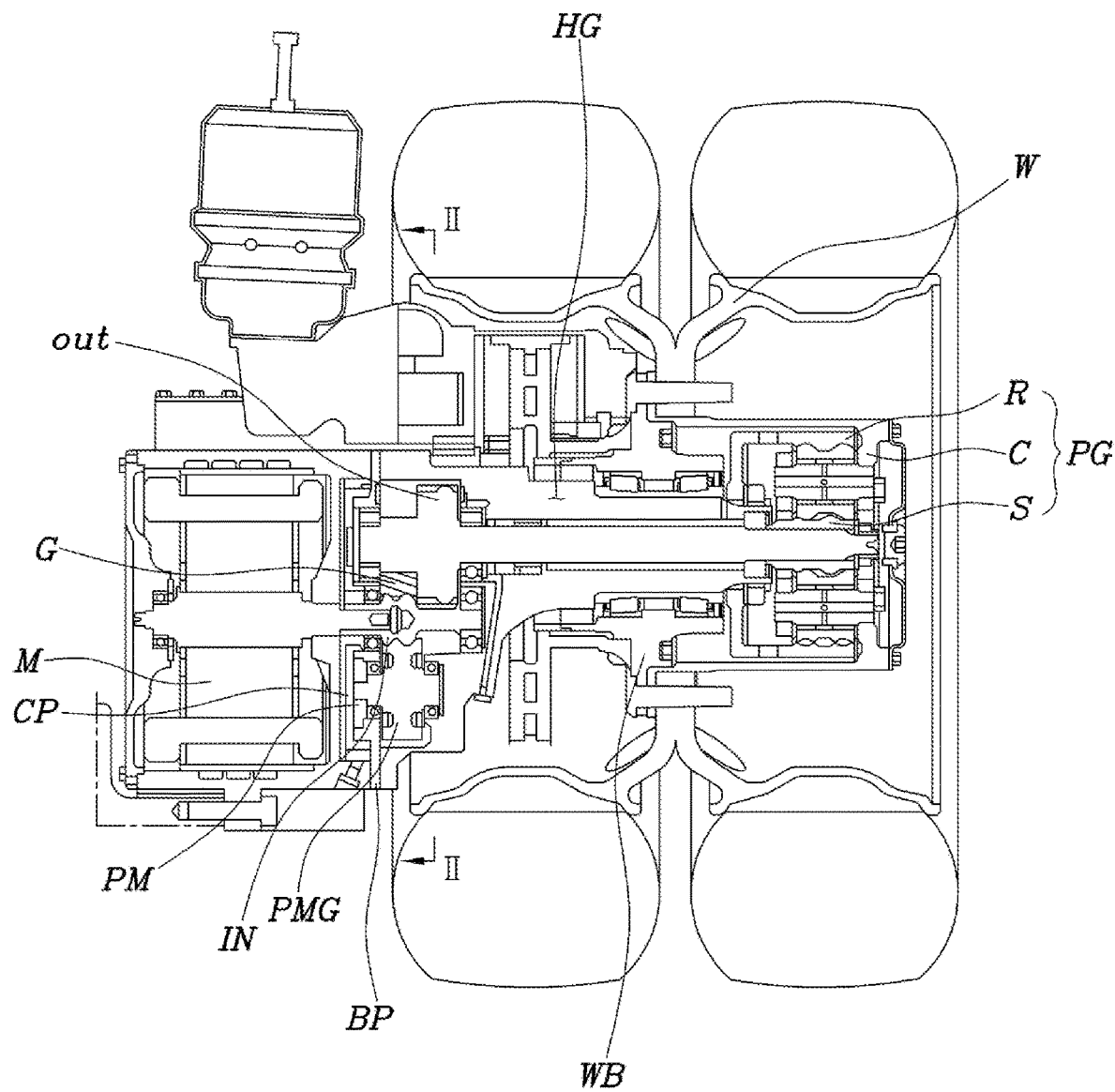
FIG. 1 is a cross-sectional view illustrating a configuration of an in-wheel motor powertrain to which a lubrication system of the present invention is applied.
Figure 2:
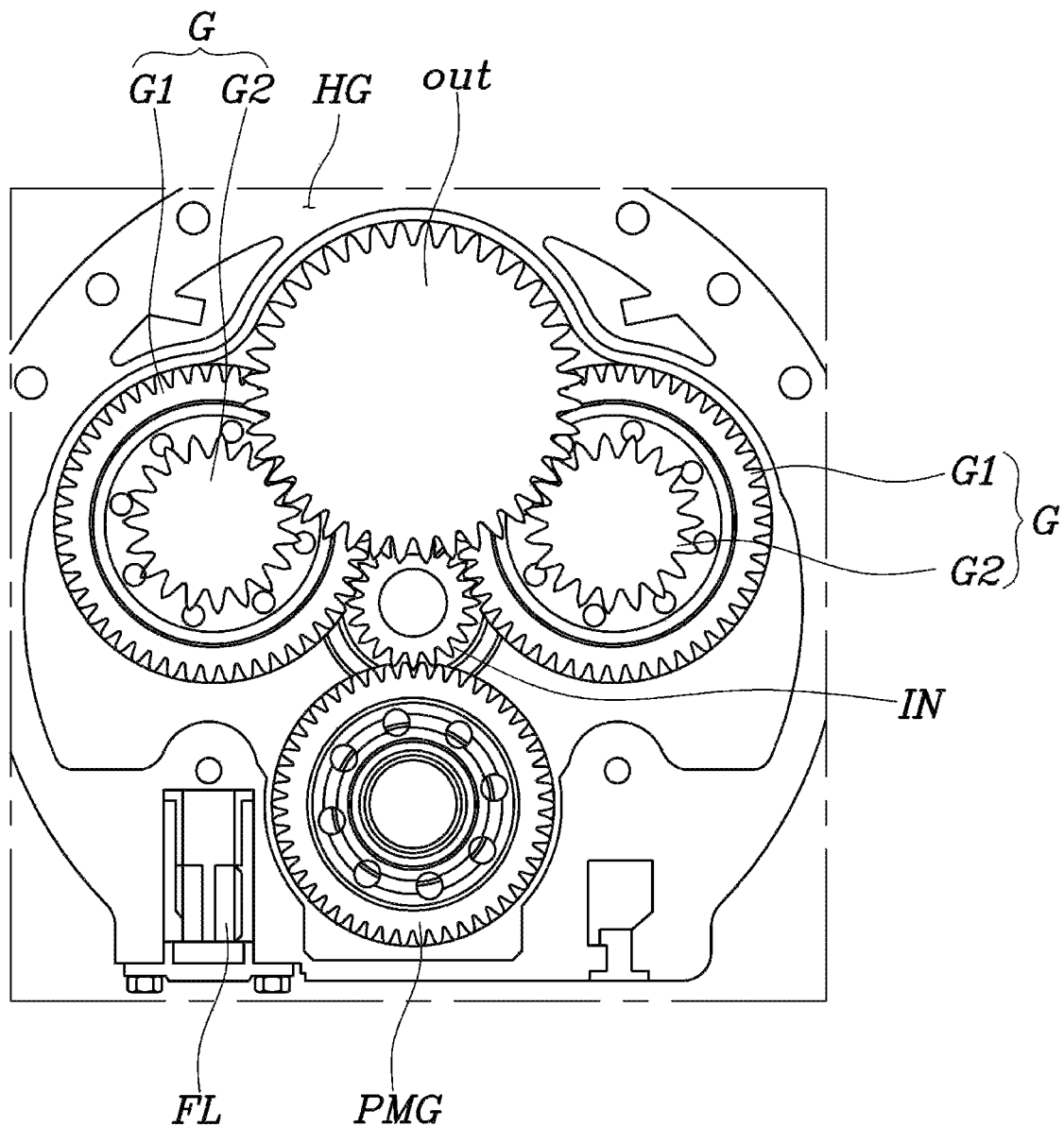
FIG. 2 is a cross-sectional view taken along the line II-II of FIG. 1.

Referring to FIGS. 1 to 5, a lubrication system for an in-wheel motor powertrain of the present invention includes: a housing HG having a motor M coupled to a first side thereof and supporting a wheel W on an outer circumferential surface and having a space therein; an input gear IN provided to be directly connected to the motor M in the housing HG; an output gear OUT disposed in parallel with the input gear IN; two intermediate gears G each provided with a first gear G1 meshed with the input gear IN, and a second gear G2 meshed with the output gear OUT and having a pitch circle diameter different from that of the first gear G1, the first and second gears being integrally and concentrically coupled together; a pump gear PMG meshed with the input gear IN; a bearing plate BP rotatably supporting the input gear IN, the output gear OUT, and the intermediate gears G on the first side of the housing HG; a cover plate CP overlapping the bearing plate BP with a mid-plate MP interposed therebetween, and configured to provide a part of a lubrication pump PM configured to be driven by the pump gear PMG to pump oil; and a first oil supply part OS1 provided by the cover plate CP and the mid-plate MP to lubricate first sides of the output gear OUT and the intermediate gears G with oil discharged from the lubrication pump PM.

In addition, the lubrication system for the in-wheel motor powertrain of the present invention further includes a second oil supply part OS2 provided in the housing HG for lubricating a second side of the output gear OUT and the intermediate gears G with the oil discharged from the lubrication pump PM.

That is, in the lubrication system of the present invention, when the lubrication pump PM, provided by the bearing plate BP, the mid-plate MP, and the cover plate CP, is rotated by receiving the driving force from the pump gear PMG to pump oil, the smooth operation and stable durability of the in-wheel motor powertrain is ensured by smoothly lubricating both ends of the output gear OUT, the intermediate gears G, and the bearings supporting the gears through the first oil supply part OS1 and the second oil supply part OS2.

For reference, a second side of the housing HG is provided with a planetary reduction mechanism PG configured to perform a further reduction in speed of the rotational force from the output gear OUT to transmit the force to the wheel W.

The planetary reduction mechanism PG is configured to decelerate, while a sun gear S is connected to the output gear OUT, a ring gear R is fixed, and a carrier C is connected to the wheel W together with a wheel hub WB.

Therefore, when the rotational force of the motor M is transmitted to the input gear IN, the first reduction in speed is performed by the first gear G1 and the input gear IN, the second reduction in speed is performed by the output gear OUT and the second gear G2, and then the third reduction in speed is performed by the planetary reduction mechanism PG. Thus, the in-wheel motor powertrain realizes a relatively high reduction ratio.

The motor M is positioned at an outer side of the cover plate CP, and a rotation shaft of the motor M is coupled to the input gear IN after sequentially passing through the cover plate CP, the mid-plate MP, and the bearing plate BP.

A rotor RT of the lubrication pump PM is provided to be rotatable on the bearing plate BP. The cover plate CP is provided with a flow-path forming groove 1 for providing an inlet-side flow path INL and an outlet-side flow path OTL of the lubrication pump PM, and the first oil supply part OS1. The mid-plate MP covers the flow-path forming groove 1 of the cover plate CP to provide the inlet-side flow path INL and the outlet-side flow path OTL of the lubrication pump PM, and the first oil supply part OS1.

That is, the bearing plate BP and the cover plate CP play a role of a pump housing HG of the lubrication pump PM, and a flow path required to configure the lubrication pump PM is provided by equipping with the flow-path forming groove 1 in the cover plate CP and covering the groove 1 with the mid-plate MP.

Therefore, the mid-plate MP is provided so that a part covering the flow-path forming groove 1 is made to provide a closed plane, and a part where the inlet-side and the outlet-side of the lubrication pump PM and a first connection pipe P1 and a second connection pipe P2 to be described later are connected thereto is provided with a thin plate having a structure in which a hole is made.

The first oil supply part OS1 is configured to include a first output gear lubrication part OR1 connected to an upper side from an outlet-side flow path of the lubrication pump PM and having a space extended to store oil at a position corresponding to the first side of the output gear OUT, and two first intermediate gear lubrication parts GR1 extending downward from both sides of the first output gear lubrication part OR1 to provide oil to positions corresponding to first sides of the two intermediate gears G.

Therefore, lubrication is performed while oil is constantly and smoothly supplied to the first side of the output gear OUT by the oil stored in the first output gear lubrication part OR1. Moreover, the first sides of the two intermediate gears G may also ensure a stable lubrication performance with the oil provided by a first intermediate gear lubrication part GR1, respectively.

Meanwhile, an oil sump SMP is provided in the housing HG; an oil filter FL is provided in the housing HG to allow oil from the oil sump SMP to be filtered; the first connection pipe P1 is provided between the housing HG and the bearing plate BP so that oil passing through the oil filter FL may be supplied to the inlet side of the lubrication pump PM.

Figure 3:
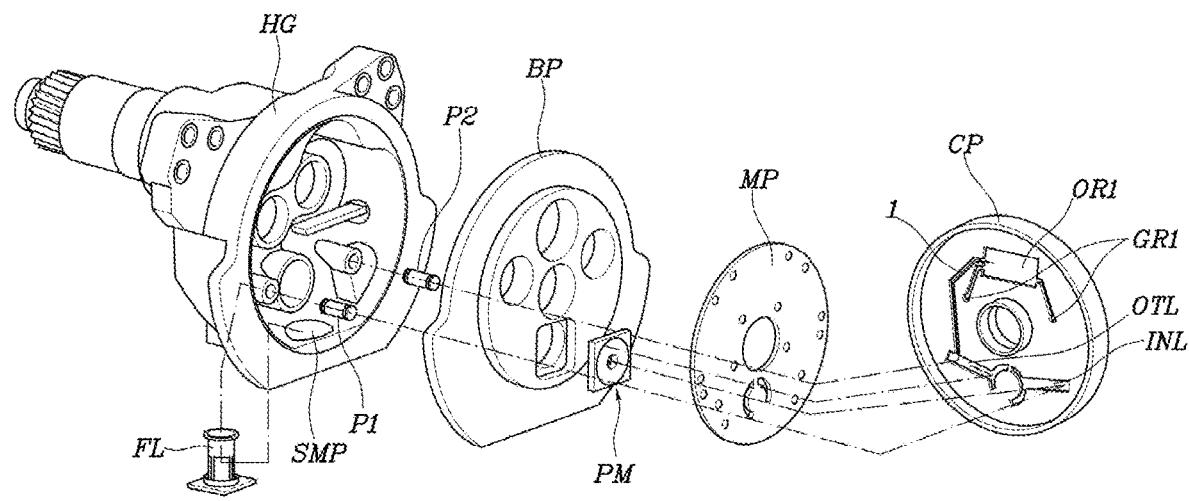
FIG. 3 is an exploded view illustrating main components of the present invention.
Figure 4:
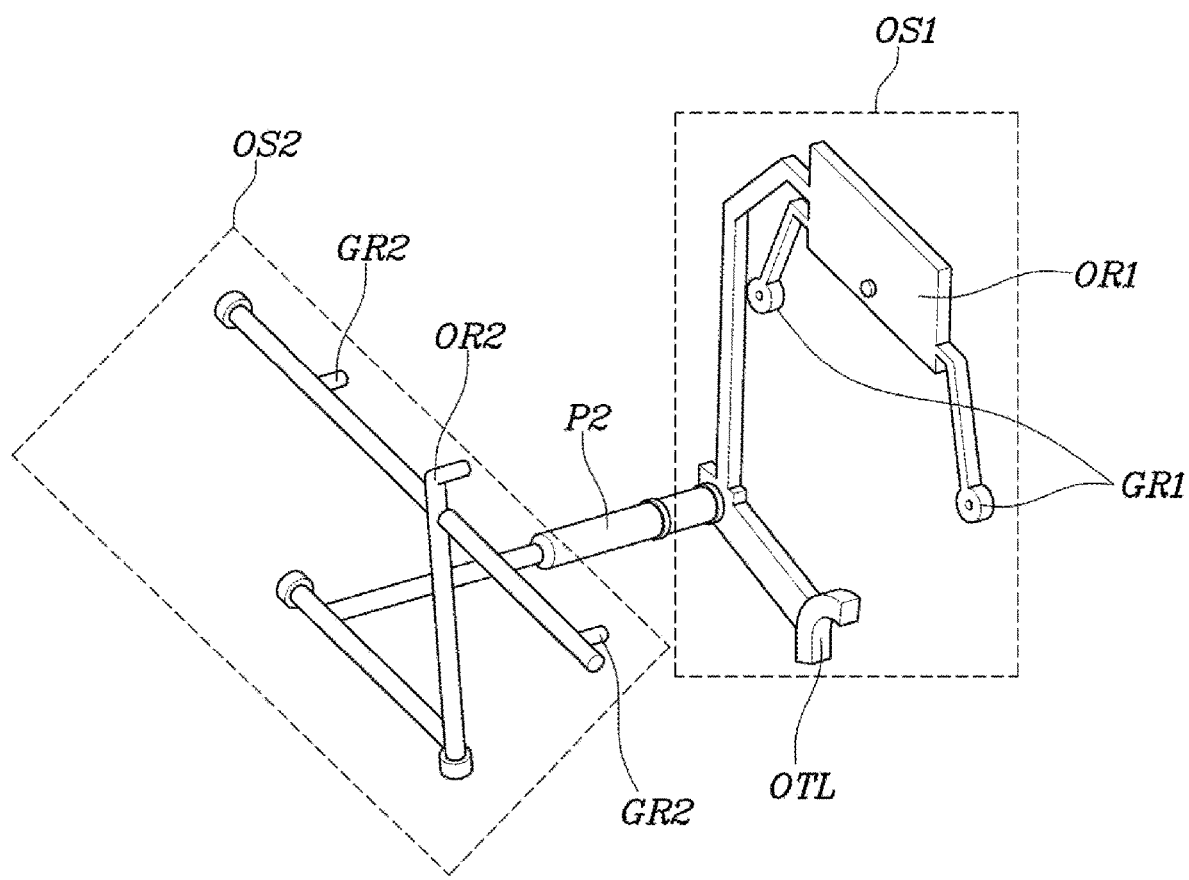
FIG. 4 is a three-dimensional view illustrating oil passages of a lubrication system of the present invention.
Figure 5:
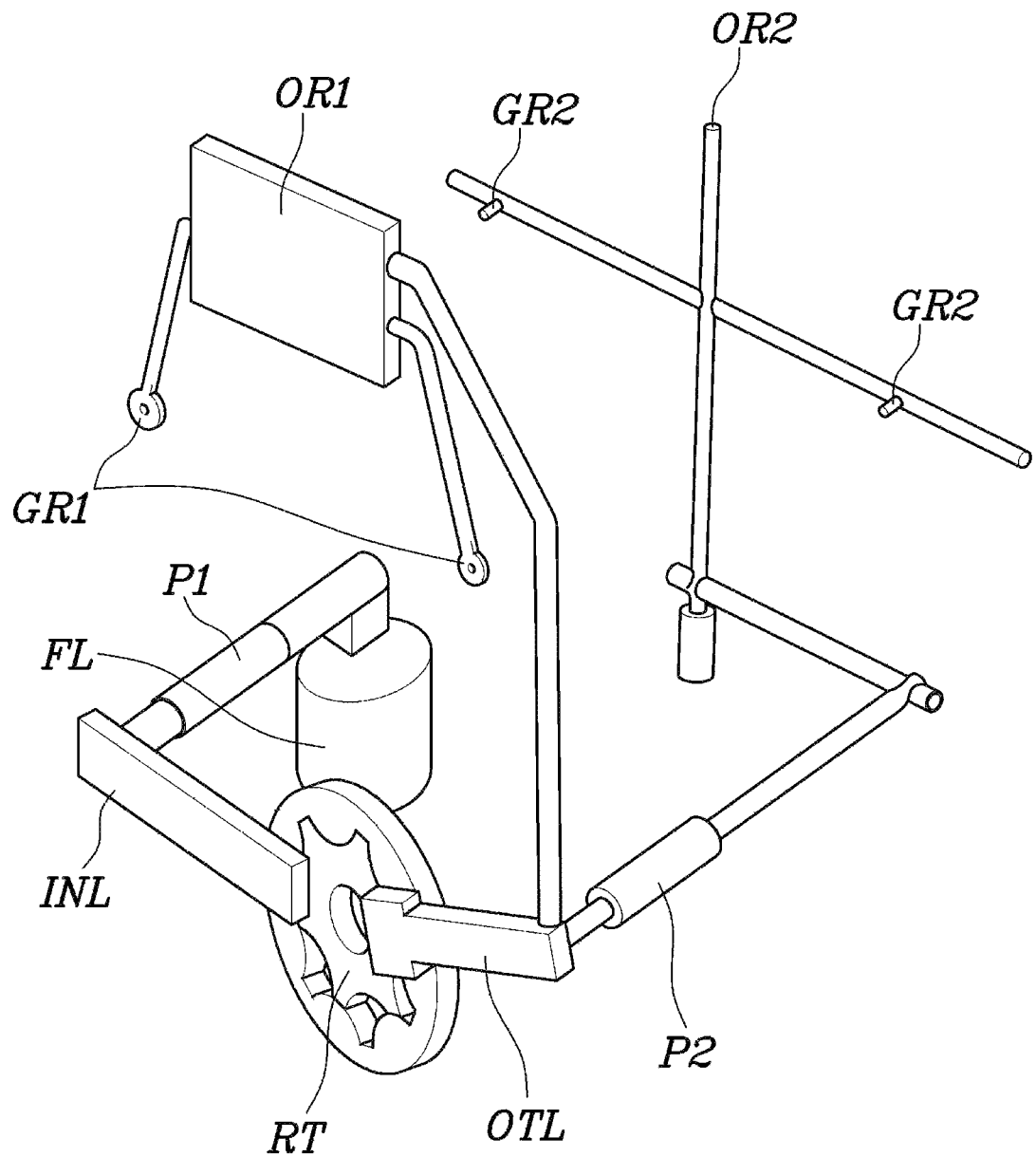
FIG. 5 is a view illustrating the oil passages of the lubrication system of the present invention represented in an opposite direction to FIG. 4.

In other words, the oil stored in the oil sump SMP of the housing HG passes through the oil filter FL and through the first connection pipe P1, as shown by an arrow illustrated in FIG. 3, to be supplied to the lubrication pump PM.

The second connection pipe P2 serving as an oil passage is provided between the outlet-side of the lubrication pump PM and the second oil supply part OS2 of the housing HG.

In other words, the outlet-side of the lubrication pump PM must supply oil to the second oil supply part OS2 and the first oil supply part OS1 at the same time. In order to supply oil to the second oil supply part OS2 provided in the housing HG, the oil must be delivered by the second connection pipe P2.

The second oil supply part OS2 may include a second output gear lubrication part OR2 configured to transfer oil supplied into the housing HG through the second connection pipe P2 to a position corresponding to the second side of the output gear OUT, and a second intermediate gear lubrication part GR2 branched from both sides of the flow path connected to the second output gear lubrication part OR2 from the second connection pipe P2 to transfer oil to positions corresponding to second sides of the two intermediate gears G.

In other words, oil from the lubrication pump PM received through the second connection pipe P2 is transferred to the second output gear lubrication part OR2 to lubricate the second side of the output gear OUT, and the oil transferred to the second intermediate gear lubrication part GR2 is to lubricate the second sides of the two intermediate gears G.

Therefore, the output gear OUT and the two intermediate gears G are always supplied with sufficient oil by both the first oil supply part OS1 and the second oil supply part OS2 to ensure smooth lubrication performance. Since the output gear OUT and the intermediate gears G are positioned above the input gear IN and the pump gear PMG, the oil lubricating and flowing down the output gear OUT and the intermediate gears G may sufficiently lubricate the input gear IN and the pump gear PMG.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A lubrication system for an in-wheel motor powertrain, the lubrication system comprising:
    a housing having a motor coupled to a first side thereof and supporting a wheel at an outer circumferential surface thereof, and having a space therein;
    an input gear directly connected to the motor in the housing;
    an output gear disposed parallel to the input gear;
    two intermediate gears each comprising a first gear meshed with the input gear, and a second gear meshed with the output gear and having a pitch circle diameter different from that of the first gear, the first and second gears being integrally and concentrically coupled together;
    a pump gear meshed with the input gear;
    a bearing plate rotatably supporting the input gear, the output gear, and the two intermediate gears on the first side of the housing;
    a cover plate overlapping the bearing plate and a mid-plate interposed between the bearing plate and the cover plate;
    a lubrication pump disposed on the cover plate and configured to be driven by the pump gear to pump oil; and
    a first oil supply part provided by the cover plate and the mid-plate to lubricate first sides of the output gear and the intermediate gears with oil discharged from the lubrication pump.

2. The lubrication system of claim 1, further comprising a second oil supply part disposed in the housing so as to achieve lubrication of second sides of the output gear and the intermediate gears with the oil discharged from the lubrication pump.

3. The lubrication system of claim 2, wherein the lubrication pump has a rotor disposed to be rotatable on the bearing plate;
    the cover plate has a flow-path forming groove for forming an inlet-side and an outlet-side flow paths of the lubrication pump and the first oil supply part; and
    the mid-plate covers the flow-path forming groove of the cover plate to form the first oil supply part and the inlet-side and the outlet-side flow paths of the lubrication pump.

4. The lubrication system of claim 3, wherein the first oil supply part comprises:
    a first output gear lubrication part connected to an upper side from the outlet-side flow path of the lubrication pump and having a space extended to store oil at a position corresponding to the first side of the output gear; and
    a first intermediate gear lubrication part extending downward from a side of the first output gear lubrication part to provide oil to a position corresponding to the first side of each of the two intermediate gears.

5. The lubrication system of claim 2, wherein
    an oil sump is disposed in the housing;
    an oil filter is disposed in the housing to allow oil from the oil sump to be filtered; and
    a first connection pipe is disposed between the housing and the bearing plate so that the oil passing through the oil filter is supplied to an inlet side of the lubrication pump.

6. The lubrication system of claim 5, wherein a second connection pipe having an oil passage therein is disposed between an outlet side of the lubrication pump and the second oil supply part of the housing.

7. The lubrication system of claim 5, wherein the second oil supply part comprises:
    a second output gear lubrication part configured to transfer oil supplied into the housing through a second connection pipe to a position corresponding to the second side of the output gear; and
    a second intermediate gear lubrication part branched to both sides from a flow path connected to the second output gear lubrication part from a second connection pipe and configured to deliver oil to positions corresponding to second sides of the two intermediate gears.

8. The lubrication system of claim 1, wherein a second side of the housing includes a planetary reduction mechanism configured to perform a further reduction in speed of rotational force from the output gear to transfer the force to the wheel.

9. The lubrication system of claim 1, wherein the motor is positioned at an outer side of the cover plate, and a rotation shaft of the motor is coupled to the input gear after sequentially passing through the cover plate, the mid-plate, and the bearing plate.

* * * * *